United States Patent [19]
Szymanski et al.

[11] 3,867,355
[45] Feb. 18, 1975

[54] METHOD FOR SPRAY DRYING POLYSTYRENE SULFONIC ACID

[75] Inventors: Chester D. Szymanski, Martinsville; Ronald N. Demartino, Wayne, both of N.J.

[73] Assignee: National Starch and Chemical Corporation, New York, N.Y.

[22] Filed: July 20, 1973

[21] Appl. No.: 381,287

[52] U.S. Cl. .................. 260/79.3 R, 260/DIG. 16
[51] Int. Cl... C08f 27/06, C08d 11/02, C08d 13/30
[58] Field of Search .......................... 260/79.3 R

[56] References Cited
UNITED STATES PATENTS

| | | | |
|---|---|---|---|
| 2,102,654 | 12/1937 | Snow | 260/79.3 A |
| 2,612,485 | 9/1952 | Baer et al. | 260/79.3 R |
| 3,072,618 | 1/1963 | Turbak | 260/79.3 R |
| 3,072,619 | 1/1963 | Turbak | 260/79.3 R |
| 3,320,218 | 5/1967 | Levine | 260/79.3 R |
| 3,642,728 | 2/1972 | Canter | 260/79.3 R |
| 3,674,525 | 7/1972 | Louthan | 260/79.5 C |

*Primary Examiner*—Ronald W. Griffin

[57] ABSTRACT

An improved method of spray drying polystyrene sulfonic acid is described, which method comprises treatment of an aqueous solution of the polymer with barium hydroxide prior to spray drying of the polymer solution. The barium hydroxide selectively converts free sulfuric acid into colloidal barium sulfate. The spray dried polymer containing residual colloidal barium sulfate is suitable in selected end-uses.

5 Claims, No Drawings

METHOD FOR SPRAY DRYING POLYSTYRENE SULFONIC ACID

This invention relates to an improved method of spray drying polystyrene sulfonic acid. More particularly, it provides a method of spray drying aqueous solutions of polystyrene sulfonic acid which contain small amounts of free sulfuric acid.

In the manufacture of polystyrene sulfonic acid according to one commercial process, the product is formed on the reaction of polystyrene dissolved in an inert, organic solvent such as methylene chloride or dichloroethane with a sulfur trioxide/organic phosphorus adduct. The resultant polystyrene sulfonic acid being insoluble in the organic solvent precipitates from the solution dropping to the bottom of the reaction vessel. A process for sulfonating polystyrene employing sulfur trioxide/organic phosphorus adducts is described in U.S. Pat. No. 3,072,618 patented Jan. 8, 1963.

The inherent nature of such reaction with sulfur trioxide results in the unavoidable, concomitant production of small but troublesome amounts of sulfuric acid. In obtaining the sulfonated polymer in dry form the organic solvent is ordinarily drawn off or decanted. Drying of the polymer wet with organic solvent, either at room temperature or at slightly higher temperatures, results in the production of a yellow colored, slightly degraded product because of the presence of the sulfuric acid. Washing of the wet sulfonated product with clean organic solvent is relatively expensive and unfeasible for that reason in removing all of the sulfuric acid. While treatment of such polystyrene sulfonic acid with ion exchange resins is effective in removing the free sulfuric acid, this procedure tends to be impractical and expensive largely because of its time-consuming nature. It is understandable that spray drying of a water solution of the sulfonated polymer containing sulfuric acid, without treatment, also leads to the production of discolored degraded product.

It is the main object of this invention to provide a method of spray drying polystyrene sulfonic acid which contains free sulfuric acid so that the dried polymer is neither discolored nor degraded during the drying operation. It is also an object of this invention to provide a method of removing free sulfuric acid from polystyrene sulfonic acid which contains free sulfuric acid.

We have now found that by treatment of the polystyrene sulfonic acid (dissolved in water) with barium hydroxide in accordance with the method of this invention, the free sulfuric acid is converted into colloidal barium sulfate. The measured amount of barium hydroxide to be added to a given amount of polystyrene sulfonic acid is calculated as the stoichiometric amount required to react with the free sulfuric acid. All or substantially all of the barium hydroxide added preferentially reacts with the free sulfuric acid rather than with the acid groups of the polymer. If a small proportion of the barium hydroxide does react with the polymer, thereby producing the barium salt of polystyrene sulfonic acid, such reaction has no significant adverse effect on the process or the resultant polymer except for a slight loss in its conductive properties. In instances where minor losses of conductivity of the polystyrene sulfonic acid can be tolerated, a small excess of barium hydroxide, up to about 5 percent, by weight, may be added to the polymer solution in order to insure that no sulfuric acid remains unreacted. The barium hydroxide treated polymer solution can then be spray dried without degradation or discoloring of the sulfonated product, and the dry polymer is collected in granular form in white or off-white color.

It is to be noted that common bases such as sodium or potassium hydroxide are unsuitable for use herein because the products formed on neutralization of the sulfuric acid with such bases (e.g. sodium or potassium sulfate) are water soluble salts which will tend to interfere with the properties or end-uses of the thus-treated polymer. More importantly, such common bases do not preferentially react with the sulfuric acid and instead neutralize the acid groups of the polymer as well thereby seriously and undesirably reducing its conductive properties.

Spray drying is well known in the art. In brief, it is a method of recovering solids from a solution or dispersion by spraying the liquid into heated gases. The solvent solution is evaporated leaving dry solids. A basic spray dryer unit comprises a drying chamber, a source of hot gases, an atomizer for the solution to be sprayed dried and a means of collecting the spray dried product. The most common spray dryer units have an upright cylindrical chamber: the spray liquor is introduced at the top of the chamber and the dried product is removed at the bottom. Spray dryer units have been available commercially for some time and such units of various design and incorporating many sophisticated improvements as, for example, in temperature control and collection means, are readily available commercially today. Essentially, the invention may be carried out employing any spray dryer unit regardless of design.

It is noted that our invention is applicable for use with polystyrene sulfonic acid prepared using sulfur trioxide or sulfur trioxide complexes as well as with oleum or chlorosulfonic acid provided the sulfonated polystyrene contains sulfuric acid impurities.

In more detail, a typical procedure of spray drying polystyrene sulfonic acid carried out in accordance with the present invention begins with the dissolving of the polymer in water to an appropriate solids content. In industrial manufacture the polystyrene sulfonic acid is ordinarily precipitated in the organic solvent medium, and on completion of the sulfonation reaction the supernatant organic solvent is decanted. The sulfonated polymer cake wet with organic solvent is thereafter dissolved in water and optionally the organic solvent is evaporated by the application of heat to the aqueous solution. It is preferred that the aqueous solution to be spray dried should have a solids content of from about 5 to 15 percent, by weight. However, solutions having solids as low as 1 percent and as high as 35 percent or higher, by weight, depending on the molecular weight of the polymer may also be used if the spray dryer unit can accommodate such solutions. Ambient temperatures are suitable for dissolving the polystyrene sulfonic acid, although moderate heat may be applied in order to hasten the dissolving of the polymer.

It is thereafter necessary to determine the amount of free sulfuric acid contained in the polymer solution, and most conveniently, this is accomplished by titration of a sample of the aqueous polymer solution against dilute sodium hydroxide. The per cent polymer solids of the sample is ordinarily obtained by means of ultraviolet absorbance of the solution. Employing the "per cent polymer solids" and the amount of sodium hydroxide required to neutralize the sample, the amount of sulfuric acid in the sample may then be calculated.

While our Examples, presented hereinafter, make use of polystyrene sulfonic acid which is fully or substantially fully sulfonated, appropriate adjustments can be made in the calculations to accommodate situations where the polymer is only partially sulfonated, as those skilled in the art will recognize.

The calculated stoichiometric amount of barium hydroxide required to neutralize (eliminate) the free sulfuric acid is added to the polymer solution preferentially first dissolved in water (about a 5–8 percent solution) although it may be added directly in solid form, if desired. The resultant polymer solution can thereafter be spray dried in conventional manner utilizing an inlet temperature with respect to the spray dryer unit of from about 175° to 225°C. and an outlet temperature of about 80° to 95°C. The dried polymer is obtained in the form of a free-flowing, granular powder.

While emphasis in describing the present invention has been placed on spray drying of the barium hydroxide treated sulfonated polymer, in variations of the method of this invention it is clear that the polystyrene sulfonic acid may simply be air dried (i.e., "tray dried") at ambient or moderately elevated temperatures or "drum dried" according to conventional drying procedures known in the art rather than being dried by means of a spray dryer unit. As previously indicated, polystyrene sulfonic acid which contains free sulfuric acid will be degraded and discolored on being tray dried or drum dried (as well as spray dried) unless it is previously treated with barium hydroxide to eliminate the free sulfuric acid. We have found that tray drying or drum drying of a polystyrene sulfonic acid solution which has been treated with barium hydroxide results in the production of a white or off-white product with no apparent degradation. While such variations of drying the polymer are not preferred, tray drying or drum drying of the polystyrene sulfonic acid may be acceptable in some circumstances and the improvement of eliminating (by means of barium hydroxide) free sulfuric acid contained in a solution of polystyrene sulfonic acid, which polymer is subsequently dried, is considered to be within the scope of the present invention.

The polystyrene sulfonic acid which has been spray dried (or drum dried or tray dried) by the method of this invention is particularly useful as an antistatic agent in the manufacture of synthetic, opaque films where low surface electrical resistivity is desired. The colloidal barium sulfate present as an impurity in the sulfonated polymer creates no problems in any such uses.

The invention will be further illustrated by the following examples which are not, however, intended to limit its scope.

EXAMPLE I

About 10,000 grams (dry) of sulfonated polystyrene, slightly wet with organic solvent, was dissolved in water to yield a polymer solution of approximately 33 percent solids, by weight. A 1-gram sample of the homogeneous solution diluted with distilled water required 21.9 ml. of 0.10N sodium hydroxide to reach an end-point using phenol phthalein indicator.

About 15,000 grams of the polymer solution was weighed and transferred to a separate container and the amount of barium hydroxide necessary to neutralize the sulfuric acid present was then determined based on the solids content and number of milliequivalents of sodium hydroxide employed in the titration of the 1-gram sample. About 830 grams of barium hydroxide dissolved in about 13,500 grams of water was added to the polymer solution. The resultant solution was thoroughly agitated and diluted to 10 percent solids, by weight. The diluted solution was thereafter spray dried using an inlet temperature of 180°–190°C. and an outlet temperature of 84°–88°C. The dried polymer was obtained as a free flowing, slightly off-white powder with no apparent degradation.

EXAMPLE II

This example illustrates that essentially no degradation of the sulfonated polymer takes place when it is spray dried in accordance with method of this invention.

A 30 percent solids, by weight, solution of polystyrene sulfonic acid (M.W. about 70,000) which had not been previously dried showed a viscosity of 220 cps (spindle No. 2, 100 rpm) when measured on a Brookfield RVF Viscometer. When the solution was spray dried under conditions described in Example I but omitting the addition of barium hydroxide, immediate charring of the dried polymer was observed. The viscosity of an aqueous solution of the thus-dried polymer was determined to be 108 cps (30 percent solids, by weight) confirming that significant degradation had taken place during the drying operation. When a portion of the aqueous solution of the not previously dried polystyrene sulfonic acid (viscosity 220 cps) was neutralized with barium hydroxide in accordance with the method of this invention, an essentially white product was obtained on spray drying. This polymer product was found to have a viscosity (30 percent solids, by weight) comparable to the viscosity of the polymer before being spray dried, indicating no degradation of the polymer.

EXAMPLE III

Samples of polystyrene sulfonic acid (not previously dried) from four production runs (containing 0.5, 2.0, 10.0 and 15.0 percent sulfuric acid, respectively) were neutralized with respect to free sulfuric acid with stoichiometric quantities of barium hydroxide and spray dried in accordance with the method of this invention. A portion of the neutralized sample which contained 2.0 percent sulfuric acid was drum dried at about 145°C. All of the dried polymers were obtained as off-white, free-flowing solids.

EXAMPLE IV

A cake of polystyrene sulfonic acid wet with organic solvent from a production run was dissolved in a minimum amount of water. The aqueous solution was moderately heated to evaporate the organic solvent, and an amount of barium hydroxide solution (8 percent, by weight) was added to the polymer solution sufficient to neutralize all of the free sulfuric acid. The treated polymer solution was thereafter placed in a drying tray and dried at 80°C. for 4 hours and subsequently at 100°C. for 2 hours. The dried polymer was free flowing and off-white in color.

Summarizing, it is seen that this invention provides a novel method of drying including spray drying polystyrene sulfonic acid polymer which contains residual free sulfuric acid so that the dried polymer is neither discolored nor degraded by the drying operation. Various modifications of this invention will be apparent to those skilled in the art and it is understood that the invention is not to be limited to that set forth above for illustrative purposes.

We claim:

1. In a method of drying a solution of polystyrene sulfonic acid containing free sulfuric acid, the improvement which comprises the step of selectively neutralizing free sulfuric acid present with a stoichiometric amount of barium hydroxide prior to drying of the polymer solution.

2. The method of claim 1, wherein in addition to the stoichiometric amount an excess of barium hydroxide up to about 5%, by weight is added to the polymer solution.

3. The method of claim 1, wherein the drying of the polymer solution is carried out by means of a spray dryer unit.

4. A method of spray drying polystyrene sulfonic acid containing free sulfuric acid which comprises:
 a. forming an aqueous solution of said polystyrene sulfonic acid,
 b. selectively neutralizing the free sulfuric acid with a stoichiometric amount of barium hydroxide up to about 5% by weight,
 c. spray drying the resultant polymer solution, and
 d. recovering dry polystyrene sulfonic acid.

5. The method of claim 4, wherein an excess of barium hydroxide is added to the polymer solution.

* * * * *